(12) United States Patent
Chotimongkol et al.

(10) Patent No.: US 8,700,404 B1
(45) Date of Patent: Apr. 15, 2014

(54) SYSTEM AND METHOD FOR USING SEMANTIC AND SYNTACTIC GRAPHS FOR UTTERANCE CLASSIFICATION

(75) Inventors: Ananlada Chotimongkol, Pittsburgh, PA (US); Dilek Z. Hakkani-Tur, Denville, NJ (US); Gokhan Tur, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1441 days.

(21) Appl. No.: 11/212,266

(22) Filed: Aug. 27, 2005

(51) Int. Cl.
*G10L 15/18* (2013.01)
*G10L 15/06* (2013.01)
*G10L 15/28* (2013.01)
*G10L 15/00* (2013.01)

(52) U.S. Cl.
USPC .......................................... 704/257; 704/255

(58) Field of Classification Search
USPC ................. 704/9–10, 231–232, 236–245, 704/246–257, E15.001–E15.009, 704/E15.014–E15.024, E11.001–E11.007
See application file for complete search history.

(56) References Cited

U.S. PATENT DOCUMENTS

| | | | | |
|---|---|---|---|---|
| 5,146,405 A * | 9/1992 | Church | | 704/9 |
| 5,444,617 A * | 8/1995 | Merialdo | | 704/9 |
| 5,467,425 A * | 11/1995 | Lau et al. | | 704/243 |
| 5,502,791 A * | 3/1996 | Nishimura et al. | | 704/256 |
| 5,610,812 A * | 3/1997 | Schabes et al. | | 704/9 |
| 5,706,365 A * | 1/1998 | Rangarajan et al. | | 707/102 |
| 5,828,999 A * | 10/1998 | Bellegarda et al. | | 704/240 |
| 6,023,677 A * | 2/2000 | Class et al. | | 704/254 |
| 6,032,111 A * | 2/2000 | Mohri | | 704/9 |
| 6,070,140 A * | 5/2000 | Tran | | 704/275 |
| 6,092,038 A * | 7/2000 | Kanevsky et al. | | 704/9 |
| 6,167,369 A * | 12/2000 | Schulze | | 704/9 |
| 6,182,039 B1 * | 1/2001 | Rigazio et al. | | 704/257 |
| 6,243,669 B1 * | 6/2001 | Horiguchi et al. | | 704/9 |
| 6,260,011 B1 * | 7/2001 | Heckerman et al. | | 704/235 |
| 6,282,507 B1 * | 8/2001 | Horiguchi et al. | | 704/3 |
| 6,314,399 B1 * | 11/2001 | Deligne et al. | | 704/257 |
| 6,415,248 B1 * | 7/2002 | Bangalore et al. | | 704/1 |
| 6,681,206 B1 * | 1/2004 | Gorin et al. | | 704/243 |
| 6,836,760 B1 * | 12/2004 | Silverman et al. | | 704/257 |
| 6,865,528 B1 * | 3/2005 | Huang et al. | | 704/9 |
| 6,928,407 B2 * | 8/2005 | Ponceleon et al. | | 704/253 |
| 6,996,520 B2 * | 2/2006 | Levin | | 704/10 |
| 7,013,265 B2 * | 3/2006 | Huang et al. | | 704/9 |
| 7,120,582 B1 * | 10/2006 | Young et al. | | 704/255 |
| 7,143,040 B2 * | 11/2006 | Durston et al. | | 704/270 |
| 7,389,233 B1 * | 6/2008 | Gish et al. | | 704/270 |
| 7,406,416 B2 * | 7/2008 | Chelba et al. | | 704/240 |
| 7,493,293 B2 * | 2/2009 | Kanungo et al. | | 706/12 |
| 7,526,424 B2 * | 4/2009 | Corston-Oliver et al. | | 704/9 |
| 2001/0051868 A1 * | 12/2001 | Witschel | | 704/9 |
| 2002/0032564 A1 * | 3/2002 | Ehsani et al. | | 704/235 |
| 2002/0082831 A1 * | 6/2002 | Hwang et al. | | 704/249 |

(Continued)

*Primary Examiner* — Pierre-Louis Desir
*Assistant Examiner* — David Kovacek

(57) ABSTRACT

Disclosed herein is a system, method and computer readable medium storing instructions related to semantic and syntactic information in a language understanding system. The method embodiment of the invention is a method for classifying utterances during a natural language dialog between a human and a computing device. The method comprises receiving a user utterance; generating a semantic and syntactic graph associated with the received utterance, extracting all n-grams as features from the generated semantic and syntactic graph and classifying the utterance. Classifying the utterance may be performed any number of ways such as using the extracted n-grams, a syntactic and semantic graphs or writing rules.

27 Claims, 7 Drawing Sheets

(56) References Cited

U.S. PATENT DOCUMENTS

| | | |
|---|---|---|
| 2002/0128831 A1* | 9/2002 | Ju et al. .......................... 704/231 |
| 2002/0152207 A1* | 10/2002 | Lyudovyk et al. ................. 707/6 |
| 2003/0083863 A1* | 5/2003 | Ringger et al. ................. 704/10 |
| 2003/0105632 A1* | 6/2003 | Huitouze et al. ............... 704/246 |
| 2003/0130849 A1* | 7/2003 | Durston et al. ................ 704/270 |
| 2003/0182102 A1* | 9/2003 | Corston-Oliver et al. ......... 704/9 |
| 2003/0187642 A1* | 10/2003 | Ponceleon et al. ............. 704/252 |
| 2004/0078204 A1* | 4/2004 | Segond et al. ................. 704/277 |
| 2004/0111255 A1* | 6/2004 | Huerta et al. .................. 704/10 |
| 2004/0117189 A1* | 6/2004 | Bennett ....................... 704/270.1 |
| 2004/0148170 A1* | 7/2004 | Acero et al. .................. 704/257 |
| 2004/0220809 A1* | 11/2004 | Wang et al. ................... 704/257 |
| 2005/0004799 A1* | 1/2005 | Lyudovyk ..................... 704/254 |
| 2005/0080613 A1* | 4/2005 | Colledge et al. ................. 704/9 |
| 2006/0041428 A1* | 2/2006 | Fritsch et al. ................. 704/257 |
| 2006/0074655 A1* | 4/2006 | Bejar et al. ................... 704/243 |
| 2006/0129397 A1* | 6/2006 | Li et al. ....................... 704/245 |
| 2006/0277031 A1* | 12/2006 | Ramsey .......................... 704/9 |

\* cited by examiner

SYSTEM AND METHOD FOR USING SEMANTIC AND SYNTACTIC GRAPHS FOR UTTERANCE CLASSIFICATION

BACKGROUND OF THE INVENTION

1. Field of the Invention

The present invention relates spoken dialog systems and more specifically to a system and method of using semantic and syntactic graphs for utterance classification.

2. Introduction

Goal-oriented spoken dialog systems aim to identify the intent of a human caller, expressed in natural language, and take actions accordingly to satisfy the caller's requests. The intent of each speaker is identified using a natural language understanding component. This step can be seen as a multi-label, multi-class call classification problem for customer care applications. An example customer care application may relate to a bank having a call-in dialog service that enables a bank customer to perform transactions over the phone audibly. As an example, consider the utterance, "I would like to know my account balance," from a financial domain customer care application. Assuming that the utterance is recognized correctly by the automatic speech recognizer (ASR), the corresponding intent (call-type) would be "Request (Balance)" and the action would be telling the balance to the user after prompting for the account number or routing this call to the billing department.

Typically these application-specific call-types are pre-designed and large amounts of utterances manually labeled with call-types are used for training call classification systems. For classification, generally word n-grams are used as features: In the "How May I Help You?" (HMIHY) call routing system, selected word n-grams, namely "salient phrases," which are salient to certain call types play an important role. For instance, for the above example, the salient phrase "account balance" is strongly associated with the call-type "Request (Balance)." Instead of using salient phrases, one can leave the decision of determining useful features (word n-grams) to a classification algorithm. An alternative would be using a vector space model for classification where call-types and utterances are represented as vectors including word n-grams.

Call classification is similar to text categorization, except that the utterances are much shorter than typical documents used for text categorization (such as broadcast news or newspaper articles); since it deals with spontaneous speech, the utterances frequently include disfluencies or are ungrammatical; and, ASR output is very noisy, typically one out of every four words is misrecognized.

Even though the shortness of the utterances may seem to imply the easiness of the call classification task, unfortunately, this is not the case. The call classification error rates typically range between 15% to 30%, depending on the application. This is mainly due to the data sparseness problem because of the nature of the input. Even for simple call-types like "Request (Balance)," there are many ways of uttering the same intent. Some examples include: "I would like to know my account balance," "How much do I owe you," "How much is my bill," "What is my current bill," "I'd like the balance on my account," "account balance," "You can help me by telling me what my phone bill is." The current classification approaches continue to perform intent classification using only the words within the utterance.

Given this data sparseness, current classification approaches require an extensive amount of labeled data in order to train a classification system with a reasonable performance. What is needed in the art is an improved system and method for spoken language understanding and classification.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the prior art. In a typical spoken language understanding system, lexical (word-based) information is obtained from an utterance to form a feature set for a classifier. Data sparseness is the result of the fact that most calls or communications are short and because of the relatively small amount of training data. There are numerous possible ways in which the same idea may be expressed. In a call situation, a user gives only a few words. A brief user utterance provides only a very small piece of information to a spoken language understanding system. This makes classification of such a user utterance by statistical methods especially difficult—in light of the contrast to the numerous ways in which the same idea may be expressed verbally. Using statistical methods to classify a user utterance relies upon a relatively sparse data set.

As a general definition of a classifier, it is a type of statistical algorithm which takes a feature representation of an object or concept and maps it to a classification label. A classification algorithm is designed to learn (to approximate the behavior of) a function which maps a vector of features into one of several classes by looking at several input-output examples of the function. Combining semantic and syntactic information with lexical information in a language understanding system improves the accuracy of the system in correctly classifying an utterance. The present invention improves upon spoken language understanding by incorporating lexical, semantic, and syntactic information into a graph corresponding to each utterance received by the system. Another aspect of the system relates to the extraction of n-gram features from these semantic and syntactic graphs. N-grams extracted from semantic and syntactic graphs are then utilized for classification of the utterance or the call. Other ways of classifying the utterance may be utilized as well. For example, the utterance may be classified by using at least one of the extracted n-grams, the syntactic and semantic graphs and writing rules as well.

The invention provides for a system, method, and computer readable medium storing instructions related to semantic and syntactic information in a language understanding system. The method embodiment of the invention is a method for classifying utterances during a natural language dialog between a human and a computing device. The method comprises receiving a user utterance; generating a semantic and syntactic graph associated with the received utterance, extracting all n-grams as features from the generated semantic and syntactic graph and classifying the utterance using the extracted n-grams or by some other means.

The invention includes aspects related to the use of semantic and syntactic information in a language understanding system, enabling more natural interaction for the human in a human-computing device dialog.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
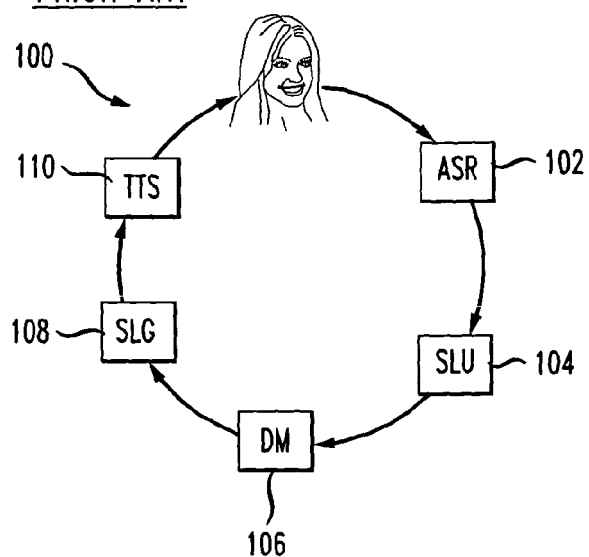
FIG. 1 illustrates a spoken dialog system.

Spoken dialog systems aim to identify human intent expressed in natural language, take actions accordingly and to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108 and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to receive the derived meaning from the SLU 104 module and generate a natural language response to help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech. There are variations that may be employed. For example, the audible speech may be generated by other means than a specific TTS module as shown.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text and may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system.

The present invention related to the use of semantic and syntactic graphs is especially related to SLU module 104, but may be implemented in a system which does not contain all of the elements illustrated in system 100. Further, the modules of system 100 may operate independent of a full dialog system. For example, a computing device such as a smartphone (or any processing device having a phone or communication capability) may have an ASR module wherein a user may say "call mom" and the smartphone may act on the instruction without a "spoken dialog."

Figure 2:
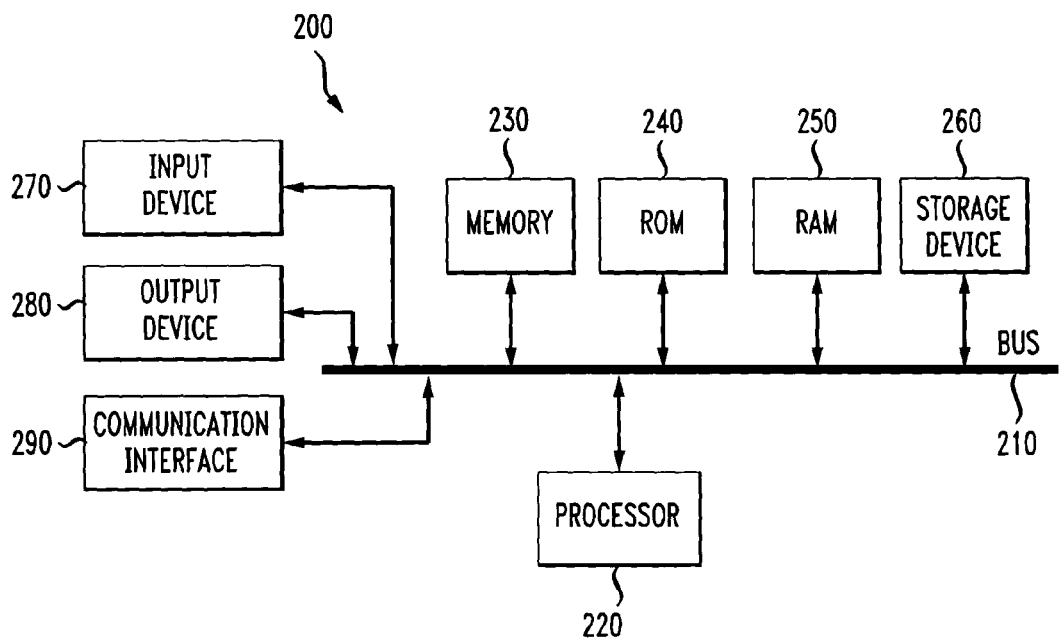
FIG. 2 illustrates a generic computing device.

FIG. 2 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general-purpose computing device 200, including a processing unit (CPU) 220, a system memory 230, and a system bus 210 that couples various system components including the system memory 230 to the processing unit 220. It can be appreciated that the invention may operate on a computing device with more than one CPU 220 or on a group or cluster of computing devices networked together to provide greater processing capability. The system bus 210 may be any of several types of bus structures including a memory bus 210 or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer, or a computer server.

To enable user interaction with the computing device 200, an input device 270 represents any number of input mechanisms, such as a microphone for speech, a touch-sensitive screen for gesture or graphical input, keyboard, mouse, motion input, speech and so forth. The device output 280 can also be one or more of a number of output means. In some instances, multimodal systems enable a user to provide multiple types of input to communicate with the computing device 200. The communications interface 290 generally governs and manages the user input and system output.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 3:
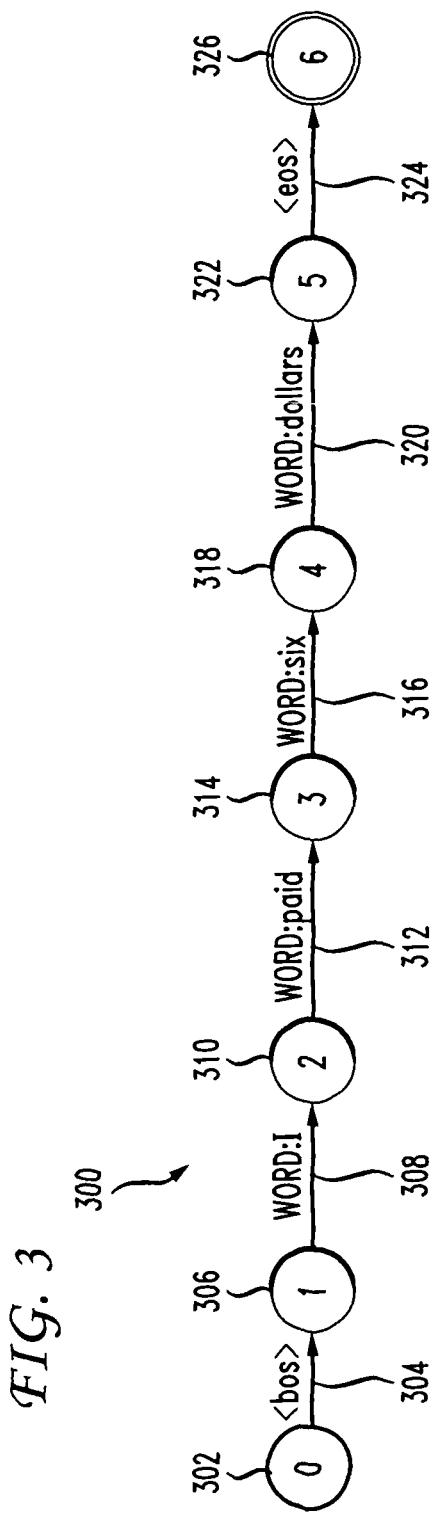
FIG. 3 illustrates an example utterance represented as a single path finite state machine (FSM)

FIG. 3 illustrates an example utterance represented as a single path finite state machine (FSM) 300. This figure contains a sequence of nodes and arcs representing states and transitions between states. Words correspond to transitions (input) which result in changes of state beginning with start state or state 0 302, state 1 304, state 2 310, state 3 314, state 4 318, state 5 322, and end state or state 6 326. The words in the example utterance act as inputs which cause changes between states in the machine.

FIG. 3 illustrates the case wherein only lexical information, i.e. word n-grams are used for call classification. This is equivalent to representing the words in an utterance as a directed acyclic graph (a graph having direction but which has no path starting and ending at the same vertex) where the words are the labels of the transitions and then extracting the transition n-grams from it. FIG. 3 shows the graph for the example sentence, "I paid six dollars," (308, 312, 316, and 320) where <bos> 304 and <eos> 324 denote the beginning and end of the sentence, respectively.

Each word is prefixed by the token "WORD:" to indicate that each is a word. The ":" is usually a notation indicating a separation of input and output symbols in finite state transducers. Here, however, its use may also relate to separating the type of token and its value. FSM 300 is incapable of identifying relationships between words beyond the order in which they appear in the example utterance.

Figure 4:
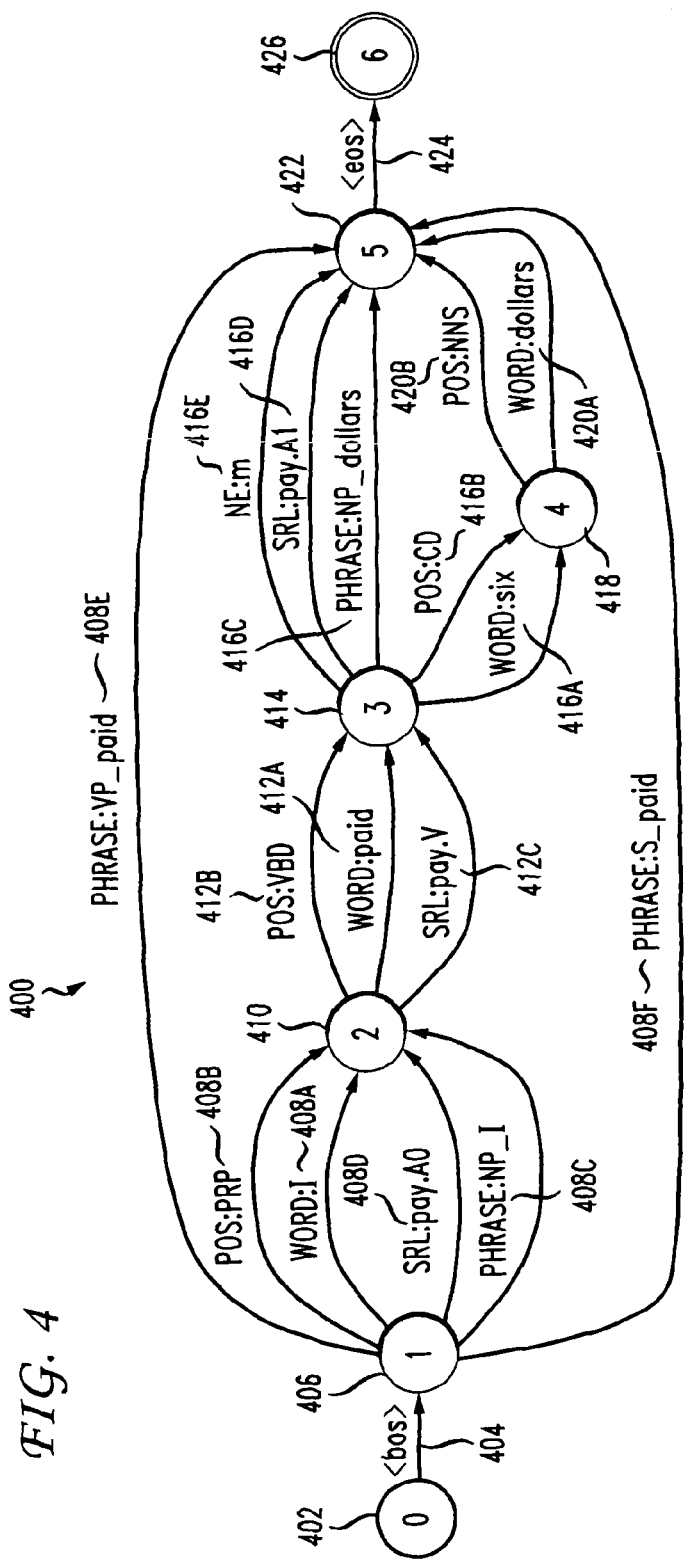
FIG. 4 illustrates an example utterance represented as a semantic syntactic graph (SSG)

FIG. 4 illustrates a semantic and syntactic graph (SSG) 400 of the same example utterance from FIG. 3, "I paid six dollars." SSGs, like the single path FSM in FIG. 3, are also directed acyclic graphs. There is an initial state 0 402 and a final state 6 426. States 1 406, 2 410, 3 414, 4 418 and 5 422 are shown by way of example. The tags <bos> 404 and <eos> 424 may denote the beginning and end of the sentence, respectively. SSGs are different, however, in that they are formed by adding transitions encoding semantic and syntactic categories of words or word sequences to the word graph. The first additional piece of information is the part of speech tags of the words. In the graph, as a parallel transition for each word of the utterance, the part of speech category of the word is added, as shown in FIG. 4 for the example sentence. Each word is still prefixed by the token "WORD:" (408Am 412Am 416A, 416C, 420A) and the part of speech tag is prefixed by the token "POS:" (408B, 412B, 416B, 420B), in order to distinguish between different types of transitions in the graph.

The other type of information that is encoded in these graphs is the syntactic parse of each utterance, namely the syntactic phrases with their head words. For example, in the sentence, "I paid six dollars," "six dollars" is a noun phrase with the head word, "dollars." In FIG. 4, the labels of the transitions for syntactic phrases are prefixed by the token "PHRASE:" (408C, 416C, 408E, 408F). Therefore, "six dollars" is also represented by the transition "PHRASE:NP_dollars" 416C. As an alternative, the head word may be dropped from the representation, or an epsilon transition may be inserted parallel to the transitions of the modifiers of the head word to eliminate them from some n-grams.

Generic named entity tags, such as person, location, and organization names, and task-dependent named entity tags, such as drug names in a medical domain, are also incorporated into the graph, where applicable. For instance, for the example sentence, "six dollars" is a monetary amount, so the arc "NE:m" 416E is inserted parallel to that sequence.

As another type of semantic information, semantic role labels (SRL) of the utterance components are incorporated to the SSGs. The semantic role labels represent predicate/argument structure of each sentence: Given a predicate, the goal is to identify all of its arguments and their semantic roles. For example, in the example sentence the predicate is "pay", the agent of the predicate is "I", and the amount is "six dollars". In the graph, the labels of the transitions for semantic roles are prefixed by the token "SRL:" 408D, 412C, 416D and the corresponding predicate. For example, the sequence "six dollars" is the amount of the predicate "pay", and this is shown by the transition with label "SRL:pay.A1" 416D following the PropBank notation. In this case "A1" or "Arg1" indicates the object of the predicate, in this case, the amount.

While the semantic and syntactic information utilized in this example may comprise part of speech tags, syntactic parses, named entity tags, and semantic role labels—it is anticipated that insertion of further information such as supertags or word stems can also be beneficial for further processing using semantic and syntactic graphs.

N-grams extracted from the SSGs are used for call classification. The n-grams in an utterance SSG can be extracted by converting it to a finite state transducer (FST), $F_i$. Each transition of $F_i$ has the labels of the arcs on the SSG as input and output. Composing this FST with another FST, $F_N$, representing all the possible n-grams, forms the FST, $F_X$, which includes all n-grams in the SSG.

$$F_X = F_i \cdot F_N$$

Figure 5:
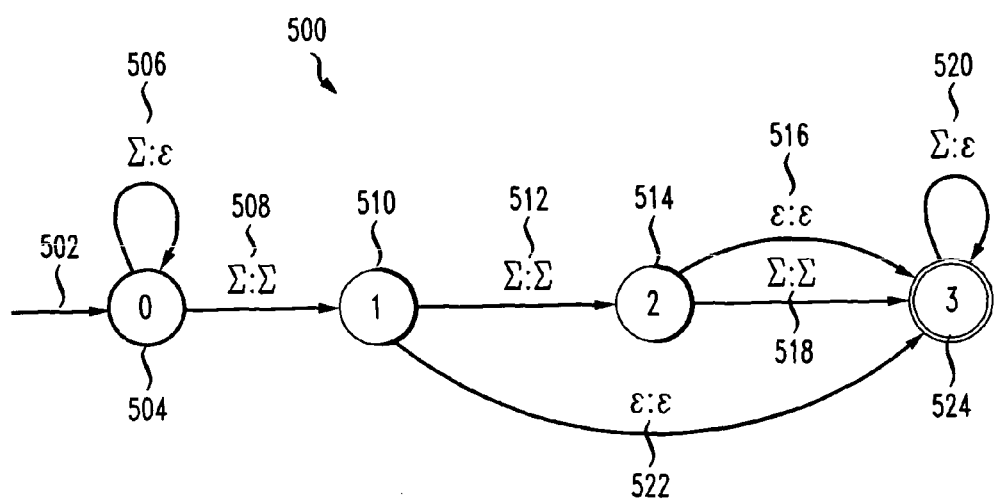
FIG. 5 illustrates the finite state transducer (FST) used to extract unigram, bigram and trigrams.

Then, extracting the n-grams in the SSG is equivalent to enumerating all paths of $F_X$. For n=3, $F_N$ 500 is shown in FIG. 5. The alphabet $\Sigma$ contains all the symbols in $F_i$. States 0 504, 1 510, 2 514 and 3 524 are shown with transitions 506, 508, 512, 522, 518, 516 and 520. The input 502 is also shown.

The use of SSGs for call or utterance classification is helpful because additional information is expected to provide some generalization, by allowing new n-grams to be encoded in the utterance graph since SSGs provide syntactic and semantic groupings. For example, the words 'a' and 'the' both have the part-of-speech tag category DT (determiner), or all the numbers are mapped to a cardinal number (CD), like the six in the example sentence. So the bi-grams WORD:six WORD:dollars and POS:CD WORD:dollars will both be in the SSG. Similarly, the sentences 'I paid six dollars' and 'I paid seventy five dollars and sixty five cents' will both have the trigram WORD:I Word:paid NE:m in their SSGs.

The head words of the syntactic phrases and predicate of the arguments are included in the SSGs. This enables the classifier to handle long distance dependences better than using other simpler methods, such as extracting all gappy n-grams. For example, consider the following two utterances: 'I need a copy of my bill' and 'I need a copy of a past due bill.' As shown in FIGS. 6 and 7, the n-gram WORD:copy 620 WORD:of 624A PHRASE:NP_bill 628C appears for both utterances, since both subsequences "my bill" and "a past due bill" are nothing but noun phrases with the head word bill.

Figure 6:
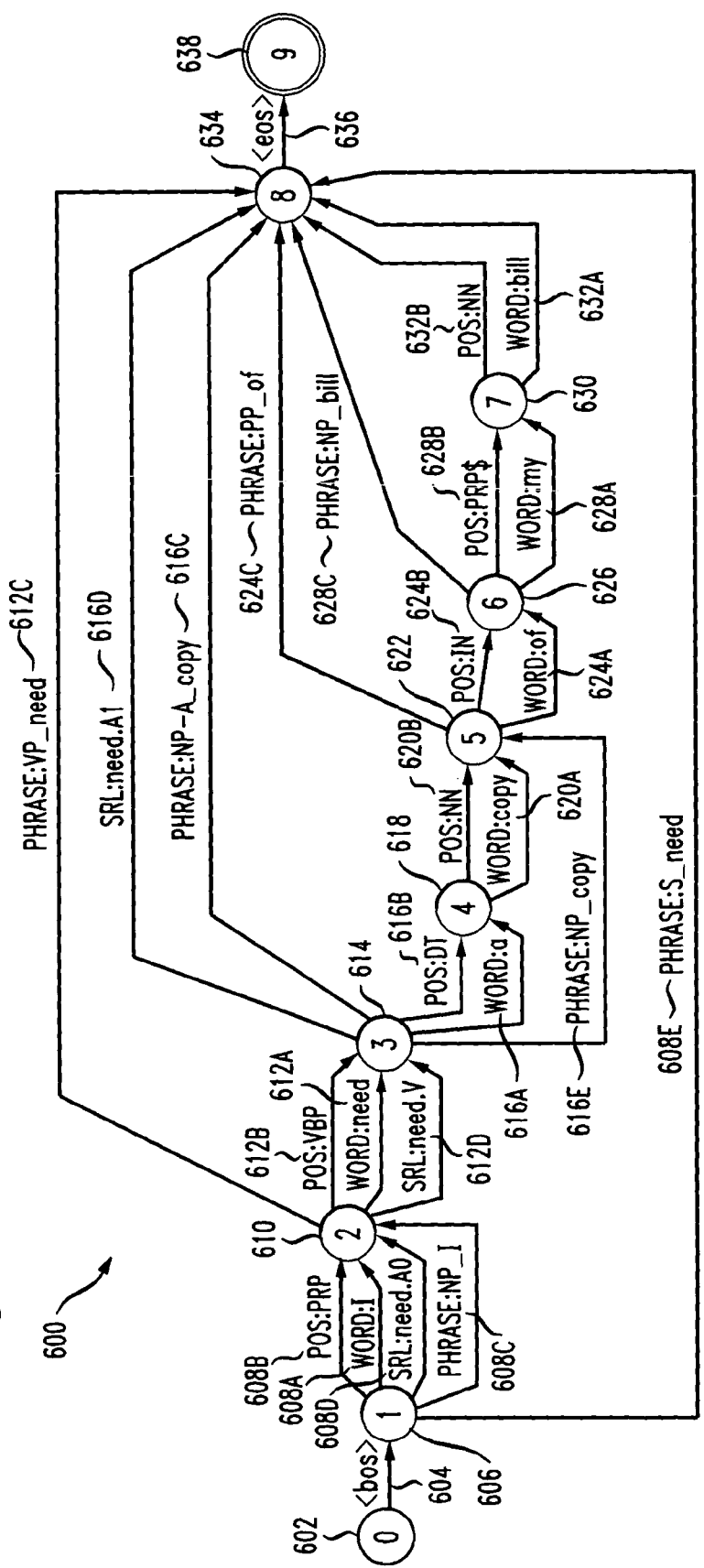
FIG. 6 illustrates an example SSG for an utterance.
Figure 7:
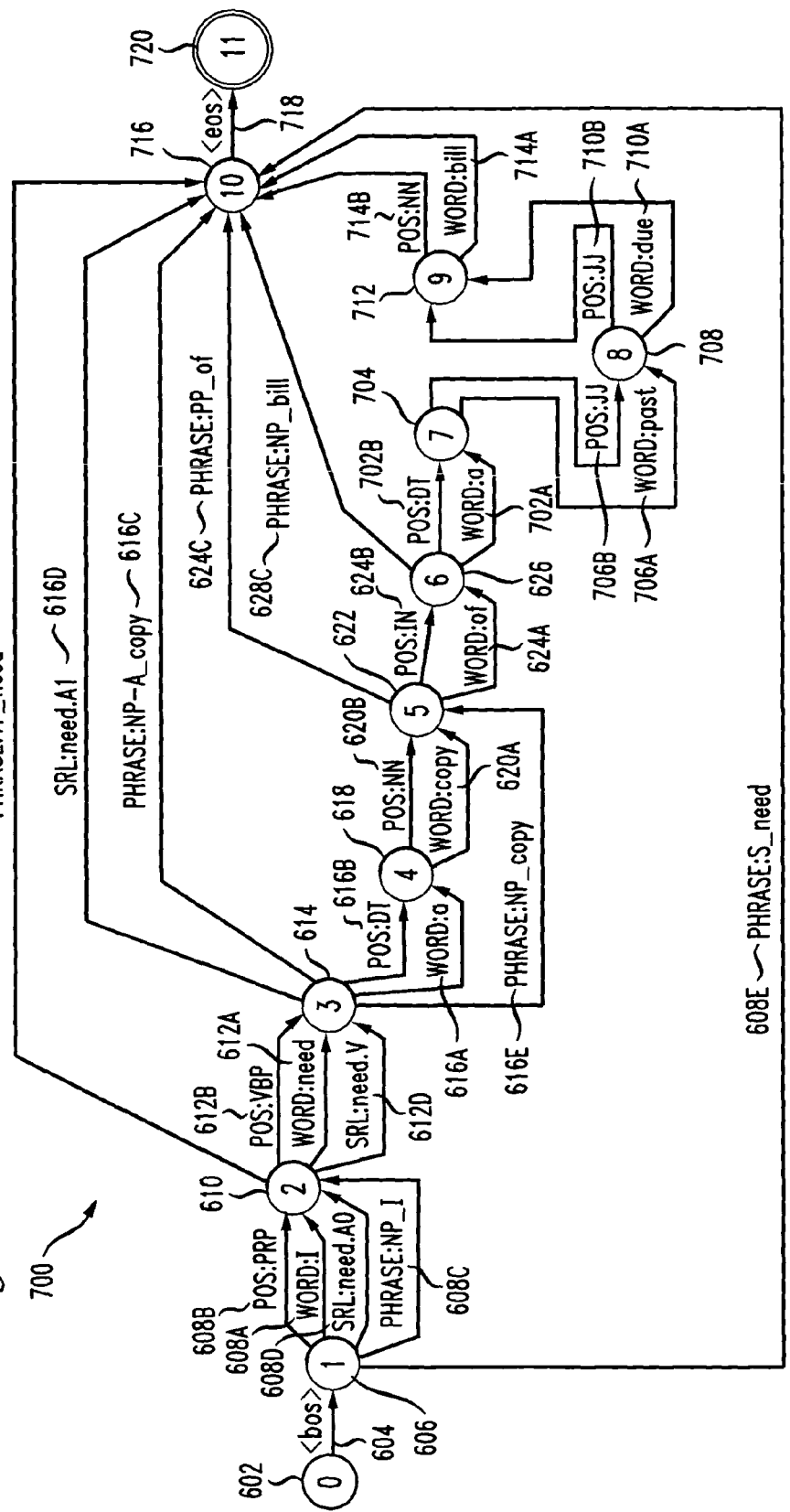
FIG. 7 illustrates an example SSG for an utterance.

FIG. 6 illustrates the SSG for the utterance "I need a copy of my bill." States 0 602, 1 606, 2 610, 3 614, 4 618, 5 622, 6 626, 7 630, 8 634 and 9 638 of the graph are shown. The <bos> 604 marks the beginning of the sentence and the transitions between the state 1 606 and state 20 610 are shown as WORD:I 608A, POS:PRP 608B, PHRASE: NL_1608C and SRL: need.A0 608D. The transition from state 1 606 to state 8 624 also includes an arc representing PHRASE: S_need 608E.

Between state 610 and state 3 614, FIG. 6 shows transitions WORD:need 612A, POS:VBP 612B, SRL:need.V 612C. From state 2 610 to state 8 624 is transition PHRASE:VP_need 612D. Between state 3 614 and state 4 618 we have transitions WORD:a 616A and POS:DT 616B. Between state 3 614 and state 5 is shown transition PHRASE: NP_copy 616E. Between state 3 614 and state 8 there is shown transitions SRL:need.A1 616D and PHRASE:NP-A_copy 616C.

Between state 4 618 and state 5 622 is shown transitions WORD:copy 620A and POS:NN 620B. Between state 5 622 and state 6 626 are transitions WORD:of 624A and POS:IN 624B. Between state 5 622 and state 8 624 is a transition PHRASE:PP_of 624C. Between state 6 626 and state 7 630 are transitions WORD:my 628A and POS:PRP$ 628B. Between state 6 626 and state 8 634 is a transition PHRASE: NP_bill 628C. Between state 7 630 and state 8 634 are transitions WORD:bill 632A and POS:NN 632B. The tag <eos> represents the end of the sentence.

FIG. 7 represents the SSG for the utterance "I need a copy of a past due bill." States 0 602, 1 606, 2 610, 3 614, 4 618, 5 622, 6 626, 7 704, 8 708, 9 712, 10 716 and 11 720 of the graph are shown. The states and transitions of FIG. 7 are similar to those for FIG. 6 from state 0 through state 6, with the exceptions that transitions 612C, 616D, 616C, 608E, 624C and 628C end at state 10 716 instead of the state 8 in FIG. 6.

Between transition 6 626 and 7 704 in FIG. 7 are shown transitions WORD:a 702A and POS:DT 702B. Between state 7 704 and state 8 708 are shown transitions WORD:past 706A and POS:JJ 706B. Between state 8 708 and state 9 712 are shown transitions WORD:due 710A and POS:JJ 710B and between state 9 712 and state 10 716 are WORD:bill 714A and POS:NN 714B. The <eos> 718 indicates the end of the sentence.

Another motivation to use SSGs is that when using simply the n-grams in an utterance, the classifier is only given lexical information. Now the classifier is provided with more and difference information using these extra syntactic and semantic features. For example, a named entity (NE) of type monetary amount may be strongly associated with some call type. Furthermore, there is a close relationship between the call-types and semantic roles. For example, if the predicate is order this is most probably the call-type Order(Item) in a retail domain application. The simple n-gram approach would consider all the appearances of the unigram order as equal. However, consider the utterance 'I'd like to check an order' of a different call-type, where the 'order' is not a predicate but an object. Word n-gram features will fail to capture this distinction.

Once the SSG of an utterance is formed, all the n-grams are extracted as features, and the decision of which one to select/use is left to the classifier.

Next the inventors discuss exemplary ways to compute an SSG using the tools for computing the information in SSGs and their performances on manually transcribed spoken dialog utterances. All of these components may be improved independently, for the specific application domain.

Part of speech tagging has been very well studied in the literature for many languages, and the approaches vary from rule-based to HMM-based and classifier-based tagging. The present invention employs a simple HMM-based tagger, where the most probable tag sequence, $\hat{T}$, given the words, W, is output:

$$\hat{T} = \underset{T}{\mathrm{argmax}}\, P(T \mid W) = \underset{T}{\mathrm{argmax}}\, P(W \mid T) P(T)$$

Due to the lack of manually tagged part of speech tags for the application of the present invention, the developmental training set is Penn Treebank. See, Mitchell P. Marcus, Beatrice Santorini, and Mary Ann Marcinkiewicz, "Building a large annotated corpus of English", Computational Linguistics, 19(2): 313-330, 1994. Penn Treebank includes data from *Wall Street Journal*, Brown, ATIS, and Switchboard corpora. The ATIS and Switchboard sets are particularly useful for the development of the present invention because they are from spoken language and include disfluencies. As a test set, an accuracy of 94.95% on manually transcribed utterances was achieved using 2,000 manually labeled words or user utterances from a spoken dialog system application.

Figure 8:
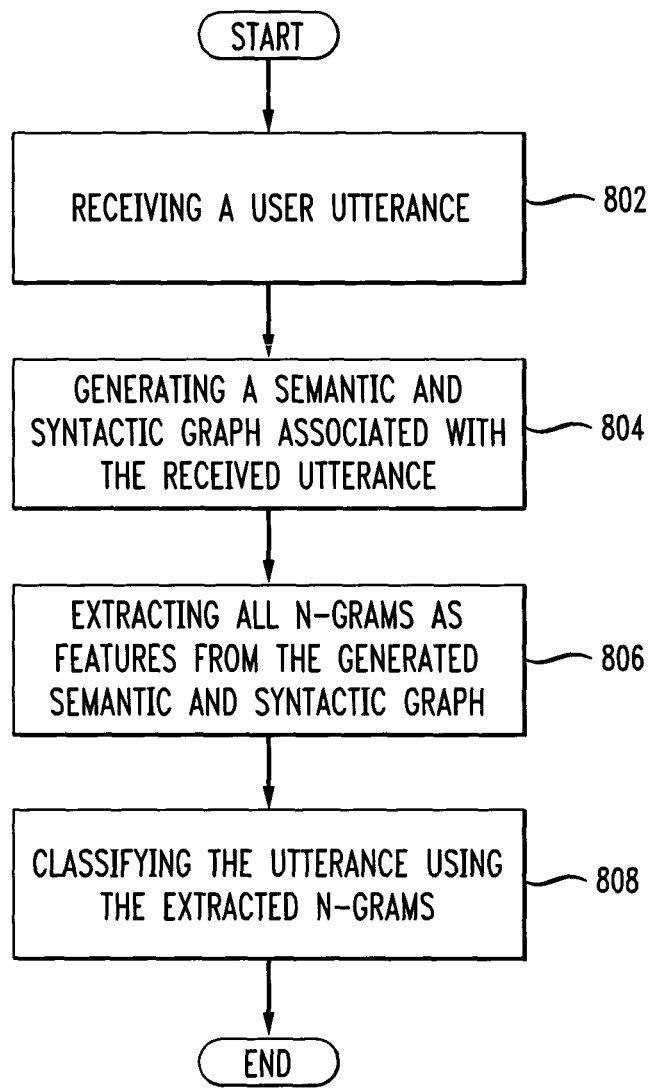
FIG. 8 illustrates an example method embodiment of the invention.

FIG. 8 illustrates an example method embodiment of the invention. The method may be practiced by any computing device as mentioned above. The method comprises receiving a user utterance (802), generating a semantic and syntactic graph associated with the received utterance (804), extracting all n-grams as features from the generated semantic and syntactic graph (806) and classifying the utterance using the extracted n-grams (808). Although step 808 mentions the extracted n-grams, classifying the utterance may be performed in many ways, such as by using the syntactic and semantic graphs, writing rules, the extracted n-grams or other means. The user utterance may be a single word, a phrase, an input sentence or any type of utterance. The utterance may also refer to non-speech input such as graffiti or motion input.

For syntactic parsing, the Collins' parser was used, which is reported to give over 88% labeled recall and precision on the *Wall Street Journal* portion of the Penn Treebank. See, Michael Collins, "Head-Driven Statistical Models for Natural Language Parsing", Ph.D. thesis, University of Pennsylvania, Computer and Information Science, Philadelpha, Pa., 1999. Buchholz's "chunklink" script was used to extract information from parse trees. See (http://ilk.kub.nl/~sabine/chunklink/chunklink_2-2-2000_for_conll.pl). Due to the lack of domain data, no performance figure is reported for this task. There is no specific requirement that the Collins parser be used. Any suitable parser may be employed for the step of syntactic parsing according to the invention.

For named entity extraction, a simple HMM-based approach, a simplified version of BBN's name finder, and a classifier-based tagger using Boostexter were used. See, e.g., Daniel M. Bikel, Richard Schwartz, and Ralph M. Weischedel, "An algorithm that learns what's in a name", Machine Learning Journal Special Issue on Natural Language Learning, 34(1-3):211-231, 1999; and Robert E. Schapire and Yoram Singer, "Boostexter: A boosting-based system for text categorization," Machine Learning, 39(2-3): 135-168, 2000. In the simple HMM-based approach, which is the same as the part of speech tagging, the goal is to find the tag sequence, $\hat{T}$, which maximizes P(T|W) for the word sequence, W. the tags in this case are named entity categories (such as "P" and "p" for Person names, "O" and "o" for Organization names, etc. where upper-case indicates the first word in the named entity) or "NA" if the word is not a part of a named entity. In the simplified version of BBN's name finder, the states of the model were word/tag combinations, where the tag $t_i$ for word $w_i$ is the named entity category of each word. Transition probabilities consist of trigram probabilities $P(w_i/t_i|w_{i-1}/t_{i-1}, w_{i-2}/t_{i-2})$ over these combined tokens. In the final version, this model was extended with an unknown words model. In the classifier-based approach, simple features such as the current word and surrounding four words, binary tags indicating if the word considered contains any digits or is formed from digits, and features checking capitalization. There is no specific requirement that the named entity extractor be the HMM-based approach using the BBN's name fined and the Boostexer application. Any suitable named entity extraction software or module may be utilized.

To test these approaches, data from a spoken dialog system application from a pharmaceutical domain, where some of the named entity categories were person, organization, drug name, prescription number, and date were used. The training and test sets contained around 11,000 and 5,000 utterances, respectively. Table 1 summarizes the overall F-measure results as well as F-measure for the most frequent named entity categories. Overall, the classifier based approach resulted in the best performance, so it is also used for the call classification experiments.

TABLE 1

F-Measure results for named entity extraction with various approaches. HMM is the simple HMM-based approach, IF is the simplified version of BBN's name finder with the unknown words model.

| Category | Count | HMM | IF | Boostexter |
|---|---|---|---|---|
| Org. | 132 | 62.0 | 73.8 | 70.9 |
| Person | 150 | 45.0 | 62.4 | 54.4 |
| Date | 178 | 51.4 | 61.9 | 72.0 |
| Drug | 220 | 65.7 | 62.3 | 63.1 |
| Overall | 836 | 54.5 | 56.8 | 64.0 |

The goal of semantic role labeling is to extract all the constituents which fill a semantic role of a target verb. Typical semantic arguments include Agent, Patient, Instrument, etc. and also adjuncts such as Locative, Temporal, Manner, Cause, etc. An exemplary corpus for this process is the semantic roles and annotations from the Penn Treebank corpus (from the Propbank or Proposition Bank project at the University of Pennsylvania) wherein the arguments are given mnemonic names, such as Arg0, Arg1, Arg-LOC, etc. See, Paul Kingsbury, Mitch Marcus, and Martha Palmer, "Adding semantic annotation to the Penn Treebank", Computational Linguistics, 19(2):313-330, 2002. For example, for the sentence "I have bought myself a blue jacket form your summer catalog for twenty five dollars last week", the agent (buyer, or Arg0) is "I", the predicate is "buy", the thing bought (Arg1) is "a blue jacket", the seller or source (Arg2) is "from your summer catalog", the price paid (Arg3) is "twenty five dollars", the benefactive (Arg4) is "myself", and the date (ArgM-TMP) is "last week".

Semantic role labeling can be viewed as a multi-class classification problem. Given a word (or phrase) and its features, the goal is to output the most probable semantic label. For semantic role labeling, an example feature set that may be used is the one taught by Hacioglu et al. in Kadri Hacioglu, Sameer Pradhan, Wayne Ward, James H. Martin, and Dan Jurafsky, "Semantic role labeling by tagging syntactic chunks," Proceedings of the Conference on Computational Natural Language Learning (CoNLL), Boston, Mass., May, 2004. As mentioned above, Boostexter is an exemplary classifier that may be used. The features include token-level features (such as the current (head) word, its part of speech tag, base phrase type and position, etc.), predicate-level features (such as the predicate's lemma, frequency, part-of-speech tag, etc.) and argument-level features which capture the relationship between the token (head word/phrase) and the predicate (such as the syntactic path between the token and the predicate, their distance, token position relative to the predicate, etc.).

In order to evaluate the performance of semantic role labeling, 285 utterances from a spoken dialog system for a retail domain were manually annotated. The utterances include 645 predicates (2.3 predicates/utterance). The precision rate for identifying the predicate was evaluated at 93.04%. The recall rate was evaluated at 91.16%. More than 90% of false alarms for predicate extraction were due to the word "please," which is very frequent in the customer care domain and is erroneously tagged. Most of the false rejections were due to diffluencies and ungrammatical utterances. For example, in the utterance "I'd like to order place an order", the predicate "place" is tagged erroneously as a noun, probably because of the preceding verb "order".

In evaluating the argument labeling performance the inventors use a strict measure wherein labeling is considered correct if both the boundary and the role of all the arguments of a predicate are correct. In this realm, Arg0 is usually the word "I" hence, mistakes in Arg0 are ignored. In the test set, the SRL tool correctly tags all arguments of 57.6% of the predicates.

Evaluation of the invention was carried-out through call classification experiments using human-machine dialogs collected by a natural spoken dialog system used for customer care. All utterances considered were in response to the greeting prompt "How may I help you?" in order not to deal with confirmation and clarification utterances. Tests were performed using the Boostexter tool, an implementation of the Boosting algorithm, which iteratively selects the most discriminative features for a given task. Data and results are presented in Tables 2 and 3.

TABLE 2

Characteristics of the data used in the experiments.

| | |
|---|---|
| Training Data Size | 3,725 utterances |
| Tesst Data Size | 1,954 utterances |
| Number of Call-Types | 79 |
| Call-Type Perplexity | 28.86 |
| Average Utterance Length | 12.08 |

TABLE 3

A comparison of number of features.

| | Baseline | Using SSG | Increase |
|---|---|---|---|
| Unigram | 2,303 | 6,875 | 2.99 times |
| Bigram | 15,621 | 112,653 | 7.21 times |
| Trigram | 34,185 | 705,673 | 20.64 times |
| Total | 52,109 | 825,201 | 15.84 times |

Table 2 summarizes the characteristics of the application including the amount of training and test data, total number of call-types, average utterance length, and call-type perplexity. Call-type perplexity is computed using the prior distribution over all the call-types in the training data.

For call classification, SSGs for the training and test set utterances were generated using the tools described above. As seen in Table 3, when n-grams are extracted from these SSGs, instead of the word graphs (Baseline), there is a huge increase in the number of features given to the classifier. The classifier has on average 15 times more features with which to work. Within the scope of this invention, the burden of analyzing these features is left to the classifier.

Table 4 presents the percentage of the features selected by Boostexter using SSGs for each information category. As expected, the lexical information is the most frequently used, and 54.06% of the selected features have at least one word in its n-gram. The total is more than 100%, since some features contain more than one category, as in the bigram feature example: "POS:DT WORD:bill". This shows the use of other information sources as well as words.

TABLE 4

The percentage of the features selected by the classifier for each information category.

| Category | Category | Frequency |
|---|---|---|
| Lexical | Words | 54.06% |
| Sentactic | Part-of-Speech | 49.98% |
| | Syntactic Parse | 27.10% |
| Semantic | Named Entity | 1.70% |
| | Semantic Role Label | 11.74% |

TABLE 5

Call classification error rates using wordsand SSGs.

| | Baseline | SSGs | Decrease |
|---|---|---|---|
| All Utterances | 23.80% | 23.29% | 2.14% |
| Low confidence Utterances | 68.77% | 62.16% | 9.61% |
| All utterances (Cascaded) | 23.80% | 22.67% | 4.74% |

Table 5 presents experimental results for call classification. As the evaluation metric, the inventors used the top class error rate (TCER), which is the ratio of utterances, where the top scoring call-type is not one of the true call-types assigned to each utterance by the human labelers. The baseline TCER on the text set using only word n-grams is 23.80%. When features are extracted from the SSGs, a 2.14% relative decrease in the error rate down to 23.29% is seen. When those results are analyzed, the inventors see that (1) for "easy to classify" utterances, the classifier already assigns a high score to the true call-type using just word n-grams; (2) the syntactic and semantic features extracted from the SSGs are not 100% accurate, as presented earlier. Although many of these features have been useful, there is a certain amount of noise introduced in the call classification training data; (3) the particular classifier used (Boosting) is known to handle large feature spaces in a different manner than other classifiers such as SVMs. This is important where there are more features.

Accordingly, the inventors focus on a subset of utterances that have low confidence scores. These are cases where the score given to the top scoring call-type by the baseline model is below a certain threshold. In this subset there were 333 utterances, which is about 17% of the test set. As expected, the error rates are much higher than the overall and the inventors get much larger improvement in performance when SSGs are used. The baseline for this set is 68.77% and using extra features reduces the baseline to 62.16% which is a 9.61% relative reduction in the error rate.

The inventors' experiments suggest a cascaded approach for exploiting SSGs for call classification. That is, first the baseline word n-gram based classifier is used to classify all the utterances, then if this model fails to commit on a call-type, the system performs extra feature extraction using SSGs and use the classification model trained with SSGs. This cascaded approach reduces the overall error rate of all utterances from 23.80% to 22.67%, which is a 4.74% relative reduction in error rate.

Although the above description may contain specific details, they should not be construed as limiting the claims in any way. Other configurations of the described embodiments of the invention are part of the scope of this invention. For example, the invention is not limited to telephone calls but may apply to any communication which may be classified, such as a call-type, message type, instant message type, and so forth. In other words, the communication may also be text, which could be classified in a particular way according to the principles of the invention. Furthermore, inasmuch as the present invention involves extending the feature set of a classifier that performs a step of classifying an utterance, there may be other attributes within the feature sets discussed above that may be employed to further extend the feature set and improve classification. Accordingly, the appended claims and their legal equivalents should only define the invention, rather than any specific examples given.

We claim:

1. A method comprising:
receiving a user utterance as part of a natural language dialog with a human user;
applying a word n-gram classifier to the user utterance to obtain a first call type for the utterance;
when a confidence associated with the first call type meets a threshold level, associating the user utterance with the first call type to yield a classified utterance;
when the confidence associated with the first call type does not meet the threshold level, performing the steps of:
(i) generating a semantic and syntactic graph associated with the user utterance;
(ii) converting the semantic and syntactic graph into a first finite state transducer;
(iii) composing the first finite state transducer with a second finite state transducer to form a third finite state transducer, wherein the second finite state transducer comprises all possible n-grams, and wherein the third finite state transducer comprises n-grams;
(iv) extracting the n-grams as features from the third finite state transducer, to yield extracted n-grams; and
(v) associating the user utterance with a second call type based on the extracted n-grams, to yield a classified utterance, wherein the second call type is determined based on semantic and syntactic features in the extracted n-grams; and
responding to the human user in the natural language dialog based on the classified utterance.

2. The method of claim 1, wherein the semantic and syntactic graph further comprises lexical information.

3. The method of claim 2, wherein the semantic and syntactic graph further comprises named entities and semantic role labels.

4. The method of claim 2, wherein the semantic and syntactic graph further comprises one of speech tags and a syntactic parse of the utterance.

5. The method of claim 1, wherein generating the semantic and syntactic graph extends a feature set of a classifier that performs classifying the user utterance.

6. The method of claim 1, wherein generating a semantic and syntactic graph associated with the user utterance further comprises adding transitions encoding semantic and syntactic categories of words to a word graph.

7. The method of claim 1, wherein generating a semantic and syntactic graph associated with the user utterance further comprises utilizing one of: part of speech tags, a syntactic parse of the utterance, generic named entity tags, supertags and word stems in the graph.

8. The method of claim 1, wherein extracting the n-grams as features from the semantic and syntactic graph further comprises enumerating all paths of the third finite state transducer.

9. The method of claim 1, wherein classifying the user utterance further comprises classifying the user utterance using one of: the extracted n-grams, the semantic, and syntactic graph and writing rules.

10. A system comprising:
a processor; and
a computer-readable storage medium having instructions stored which, when executed by the processor, cause the processor to perform operations comprising:
receiving a user utterance as part of a natural language dialog with a human user;
applying a word n-gram classifier to the user utterance to obtain a first call type for the utterance;
when a confidence associated with the first call type meets a threshold level, associating the user utterance with the first call type to yield a classified utterance;
when the confidence associated with the first call type does not meet the threshold level, performing the steps of:
(i) generating a semantic and syntactic graph associated with the user utterance;
(ii) converting the semantic and syntactic graph into a first finite state transducer;
(iii) composing the first finite state transducer with a second finite state transducer to form a third finite state transducer, wherein the second finite state transducer comprises all possible n-grams, and wherein the third finite state transducer comprises n-grams;
(iv) extracting the n-grams as features from the third finite state transducer, to yield extracted n-grams; and
(v) associating the user utterance with a second call type based on the extracted n-grams, to yield a classified utterance, wherein the second call type is determined based on semantic and syntactic features in the extracted n-grams; and
responding to the human user in the natural language dialog based on the classified utterance.

11. The system of claim 10, wherein the semantic and syntactic graph further comprises lexical information.

12. The system of claim 11, wherein the semantic and syntactic graph further comprises named entities and semantic role labels.

13. The system of claim 11, wherein the semantic and syntactic graph further comprises one of speech tags and a syntactic parse of the utterance.

14. The system of claim 10, wherein generating the semantic and syntactic graph further extends a feature set of a classifier that classifies the user utterance.

15. The system of claim 10, wherein generating the semantic and syntactic graph associated with the received utterance further adds transitions encoding semantic and syntactic categories of words to a word graph.

16. The system of claim 10, wherein generating the semantic and syntactic graph associated with the user utterance further utilizes one of: part of speech tags, a syntactic parse of the utterance, generic named entity tags, supertags, and word stems in the graph.

17. The system of claim 10, wherein extracting the n-grams as features from the semantic and syntactic graph further enumerates all paths of the third finite state transducer.

18. The system of claim 10, wherein classifying the user utterance further classifies the user utterance using one of: the extracted n-grams, the semantic and syntactic graph and writing rules.

19. A computer-readable storage device having instructions stored which, when executed by a computing device, cause the computing device to perform operations comprising:
receiving a user utterance as part of a natural language dialog with a human user;

applying a word n-gram classifier to the user utterance to obtain a first call type for the utterance;
when a confidence associated with the first call type meets a threshold level, associating the user utterance with the first call type to yield a classified utterance;
when the confidence associated with the first call type does not meet the threshold level, performing the steps of:
  (i) generating a semantic and syntactic graph associated with the user utterance;
  (ii) converting the semantic and syntactic graph into a first finite state transducer;
  (iii) composing the first finite state transducer with a second finite state transducer to form a third finite state transducer, wherein the second finite state transducer comprises all possible n-grams, and wherein the third finite state transducer comprises n-grams;
  (iv) extracting the n-grams as features from the third finite state transducer, to yield extracted n-grams; and
  (v) associating the user utterance with a second call type based on the extracted n-grams, to yield a classified utterance, wherein the second call type is determined based on semantic and syntactic features in the extracted n-grams; and
responding to the human user in the natural language dialog based on the classified utterance.

20. The computer-readable storage device of claim 19, wherein the semantic and syntactic graph further comprises lexical information.

21. The computer-readable storage device of claim 20, wherein the semantic and syntactic graph further comprises named entities and semantic role labels.

22. The computer-readable storage device of claim 20, wherein the semantic and syntactic graph further comprises one of speech tags and a syntactic parse of the utterance.

23. The computer-readable storage device of claim 19, wherein generating a semantic and syntactic graph extends a feature set of a classifier that performs classifying the user utterance.

24. The computer-readable storage device of claim 19, wherein generating a semantic and syntactic graph associated with the user utterance further comprises adding transitions encoding semantic and syntactic categories of words to a word graph.

25. The computer-readable storage device of claim 19, wherein generating a semantic and syntactic graph associated with the user utterance further comprises utilizing one of: part of speech tags, a syntactic parse of the utterance, generic named entity tags, supertags, and word stems in the graph.

26. The computer-readable storage device of claim 19, wherein extracting n-grams as features from the semantic and syntactic graph further comprises enumerating all paths of the third finite state transducer.

27. The computer-readable storage device of claim 19, wherein classifying the user utterance further comprises classifying the user utterance based on one of: the extracted n-grams, the semantic and syntactic graph and writing rules.

* * * * *